United States Patent
Dai et al.

(10) Patent No.: US 11,084,947 B2
(45) Date of Patent: Aug. 10, 2021

(54) SELF-HEALING, UV-ABSORBING POLYMER COATING

(71) Applicant: GM Global Technology Operations LLC, Detroit, MI (US)

(72) Inventors: Fang Dai, Troy, MI (US); Mahmoud Abd Elhamid, Troy, MI (US); Anne M. Dailly, West Bloomfield, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 419 days.

(21) Appl. No.: 15/845,402

(22) Filed: Dec. 18, 2017

(65) Prior Publication Data

US 2019/0185685 A1  Jun. 20, 2019

(51) Int. Cl.
*C09D 5/32* (2006.01)
*C09D 4/00* (2006.01)
*B05D 3/06* (2006.01)
*C08J 7/04* (2020.01)

(52) U.S. Cl.
CPC ............ *C09D 5/32* (2013.01); *B05D 3/067* (2013.01); *C08J 7/0427* (2020.01); *C09D 4/00* (2013.01); *C08J 2377/06* (2013.01)

(58) Field of Classification Search
CPC .. C09D 5/32; C09D 4/00; C08J 7/0427; C08J 2377/06; B05D 3/067
USPC ........................................................ 427/508
See application file for complete search history.

(56) References Cited

U.S. PATENT DOCUMENTS

| 2015/0044517 | A1* | 2/2015 | Mikhaylik | H01M 4/134 429/49 |
| 2017/0158886 | A1* | 6/2017 | Odarczenko | C09D 163/00 |
| 2019/0058215 | A1* | 2/2019 | Dai | H01M 10/0568 |

FOREIGN PATENT DOCUMENTS

| CN | 104125965 A | 10/2014 |
| CN | 104877544 A | 9/2015 |

OTHER PUBLICATIONS

George et al., "A study of the photopolymerization kinetics of methyl methacrylate using novel benzophenone initiators", (Polym. Int., 50:897-905 (2001)). (Year: 2001).*

* cited by examiner

*Primary Examiner* — Ling Siu Choi
*Assistant Examiner* — Ronald Grinsted
(74) *Attorney, Agent, or Firm* — Quinn IP Law

(57) ABSTRACT

Systems and methods of providing a self-healing UV-protective polymer coating include a polymer matrix formed by initiating polymerization of a UV-absorbing-matrix precursor and a UV initiator and a self-healing portion disposed within the polymer matrix. The polymer matrix includes a plurality of active sites therein. The self-healing portion includes a self-healing precursor that is flowable and a self-healing initiator. The self-healing initiator is configured to polymerize the self-healing precursor using a cationic ring opening process.

18 Claims, 1 Drawing Sheet

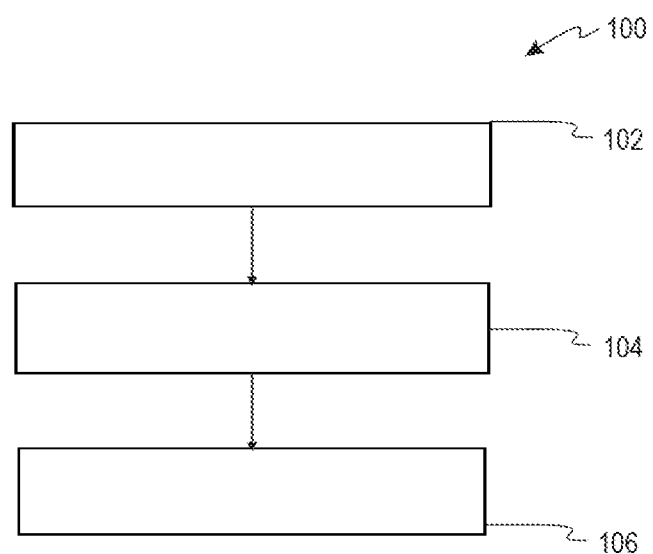

SELF-HEALING, UV-ABSORBING POLYMER COATING

INTRODUCTION

The disclosure relates to the field of UV-absorbing polymer coatings and, more specifically, to systems and methods of providing UV-absorbing polymer coatings with self-healing properties.

Fabrics and components may be formed from UV-sensitive materials. The materials, if exposed to UV radiation, will degrade physically and/or aesthetically. For example, physical degradation can reduce strength, flexibility, or rigidity of components formed from UV-sensitive materials. Aesthetic degradation, such as browning of the UV-sensitive material, may reduce the ability to implement components formed from UV-sensitive materials even if no appreciable physical degradation occurs because consumers may find such color changes undesirable.

SUMMARY

Physical and aesthetic degradation of UV-sensitive materials reduce the desirability of these materials for use in fabrics and components, particularly structural components. A self-healing polymer as disclosed herein may be implemented to improve desirability of UV-sensitive materials.

According to aspects of the present disclosure, a method includes preparing a binary mixture including a matrix precursor portion and a self-healing portion, forming a self-healing polymer coating by initiating polymerization of the UV-absorbing-matrix precursor and the UV initiator to thereby form a polymer matrix, and protecting an exterior surface of a UV-sensitive substrate with the self-healing polymer coating. The self-healing portion includes a self-healing precursor that is flowable and a self-healing initiator. The matrix precursor portion includes a UV-absorbing-matrix precursor and a UV initiator. The self-healing portion is disposed substantially throughout the polymer matrix. The polymer matrix includes a plurality of active sites therein.

According to further aspects of the present disclosure, the self-healing precursor is a cyclic ether and the self-healing initiator is a Lewis acid compound.

According to further aspects of the present disclosure, the UV-absorbing-matrix precursor is a branched acrylate.

According to further aspects of the present disclosure, the binary mixture is applied to the UV-sensitive substrate prior to forming the self-healing polymer coating.

According to further aspects of the present disclosure, the self-healing precursor is a cyclic ether having a chemical formula of $CH_2OC_2H_4O$ and the self-healing initiator is an alkali metal bis(fluorosulfonyl)imide.

According to further aspects of the present disclosure, the UV-absorbing-matrix precursor is a branched acrylate having a functional moiety selected from the group consisting of a carboxylic acid and an ester and the UV initiator is 1,1-diphenylmethanone.

According to further aspects of the present disclosure, forming the self-healing polymer coating includes applying the binary mixture to a removable backer, and protecting the exterior surface of the UV-sensitive substrate includes removing the self-healing polymer coating from the removable backer and applying the self-healing polymer coating to the exterior surface of the UV-sensitive substrate.

According to further aspects of the present disclosure, the UV-sensitive substrate includes para-aramid.

According to further aspects of the present disclosure, the UV-sensitive substrate is a pressurized vessel.

According to further aspects of the present disclosure, the method further includes filling, in response to a fracture formed in the polymer matrix contacting the self-healing precursor, at least a portion of the fracture with the self-healing precursor and polymerizing, in response to the self-healing precursor contacting the self-healing initiator, the self-healing precursor to thereby inhibit propagation of the fracture through the self-healing polymer coating.

According to further aspects of the present disclosure, the self-healing portion is present in the binary mixture in an amount of 50% by weight based on the weight of the binary mixture and the matrix precursor portion is present in the binary mixture in an amount of 50% by weight based on the weight of the binary mixture.

According to aspects of the present disclosure, a self-healing polymer coating includes a polymer matrix formed by initiating polymerization of a UV-absorbing-matrix precursor, and the polymer matrix includes a UV initiator and a self-healing portion disposed therein. The polymer matrix includes a plurality of active sites therein. The self-healing portion includes a self-healing precursor that is flowable and a self-healing initiator. The self-healing initiator is configured to polymerize the self-healing precursor using a cationic ring opening process.

According to further aspects of the present disclosure, the self-healing precursor is a cyclic ether and the self-healing initiator is a Lewis acid compound.

According to further aspects of the present disclosure, the UV-absorbing-matrix precursor is a branched acrylate.

According to further aspects of the present disclosure, the UV-absorbing-matrix precursor is a branched acrylate having a functional moiety selected from the group consisting of a carboxylic acid and an ester and the UV initiator is 1,1-diphenylmethanone.

According to further aspects of the present disclosure, the self-healing precursor is a cyclic ether having a chemical formula of $CH_2OC_2H_4O$ and the self-healing initiator is an alkali metal bis(fluorosulfonyl)imide.

According to further aspects of the present disclosure, the self-healing initiator is a UV initiator.

According to further aspects of the present disclosure, the self-healing initiator is the UV initiator.

According to further aspects of the present disclosure, the self-healing precursor, in response to contact with a fracture in the self-healing polymer coating, fills at least a portion of the fracture, and the self-healing precursor, in response to contact with the self-healing initiator, polymerizes to thereby inhibit propagation of the fracture.

According to further aspects of the present disclosure, the self-healing precursor is a cyclic ether and the self-healing initiator is a Lewis acid compound.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

The FIGURE illustrates a schematic method according to aspects of the present disclosure.

DETAILED DESCRIPTION

UV-sensitive materials, such as para aramid, degrade in the presence of UV light. Beneficially, inclusion of a self-healing polymer coating as described herein may improve operable lifetime of components that include UV-sensitive materials by reducing or avoiding physical and/or aesthetic degradation. Moreover, the self-healing polymer disclosed herein may reduce manufacturing costs, which may include using an enclosure to protect the UV sensitive fibers. The self-healing polymer may also provide benefits other self-healing materials by avoiding costs of metal catalyst initiators such as rare metal catalysts.

The self-healing polymer disclosed herein may be implemented as a topcoat for UV-sensitive substrates. For example, the self-healing polymer may be used as a topcoat for pressurized vessels to maintain the pressure rating of the pressurized vessel for longer periods. Beneficially, the self-healing polymer disclosed herein may improve longevity of the topcoat because the self-healing polymer inhibits topcoat cracking that occurs during volume changes of the pressure vessel such as those experienced during charging and discharging of the pressure vessel.

Further, the self-healing polymer may be used to protect clothing and protective gear, such as kevlar-based clothing, where use of the clothing and protective gear includes prolonged exposure to sunlight. Moreover, the self-healing polymer disclosed herein may provide for assessment of degradation of the UV-sensitive substrate without requiring removal of external layers to expose a view of the UV-sensitive substrate. For example, end users may paint the component to cover up aesthetic degradation such as browning. However, such action covers indicia of degradation and may obscure indications that a component is approaching the end of its operable life at a given rating.

Moreover, the self-healing polymer as disclosed herein provides for protection of a UV-sensitive substrate with fewer components and lower cost of production than typical methods of abating degradation of UV-sensitive substrates. Further, the self-healing polymer as disclosed herein is chemically stable to withstand weathering due to air and moisture.

Beneficially, the self-healing polymer disclosed herein provides for protection of a UV-sensitive substrate even after an exterior of the self-healing polymer coating has been disrupted by, for example, a scratch or abrasion. In systems not implementing the self-healing polymer disclosed herein, such a scratch or abrasion would provide for increased UV penetration at that point as compared to an unabraded surface. Moreover, the UV penetration would increase further with continued use of the system because such cracks tend to grow with use of the system. However, the self-healing polymer avoids such increased UV penetration by inhibiting propagation of the crack. In some aspects, self-healed portions of the self-healing polymer also inhibit UV penetration therethrough.

The self-healing polymer is formed from a binary mixture that includes a UV-absorbing-matrix precursor portion and a self-healing portion. In some aspects, the self-healing portion is present in the binary mixture in an amount of 50% by weight based on the weight of the binary mixture and the matrix precursor portion is present in the binary mixture in an amount of 50% by weight based on the weight of the binary mixture.

The UV-absorbing-matrix precursor portion is configured to form a polymer matrix that defines a structure of the self-healing polymer. The UV-absorbing-matrix precursor portion includes a matrix precursor and a UV initiator. The matrix precursor is configured to form the polymer of the polymer matrix. In some aspects, the matrix precursor is a branched precursor. In some aspects, the matrix precursor is a branched acrylate having a functional moiety selected from the group consisting of a carboxylic acid and an ester.

Surprisingly, the self-healing polymer coating as disclosed herein, such as an acrylate-based polymer, immediately inhibits penetration of UV radiation to the UV-sensitive substrate. This provides for use of UV radiation to initiate polymerization of the self-healing polymer while reducing the risk of degradation of the UV-sensitive substrate.

Further, branched acrylates as disclosed herein may be beneficially implemented to form co-polymers with hexamethylene cyclotrisiloxane, poly(ethylene glycol) methyl ether methacrylate, and Polydimethylsiloxane. Beneficially, the polymer matrix as disclosed herein is compatible with UV-absorber or stabilizer components such as 2-(2',4'-dimethylbenzoyl)benzoic acid and benzophenone.

The UV initiator is configured to initiate polymerization of the matrix in response to being exposed to UV light. For example, the UV initiator may be 1,1-diphenylmethanone. Beneficially, UV initiators provide for polymerization of the matrix that may be quickly initiated or halted. Moreover, UV-initiated crosslinking and/or polymerization may further inhibit penetration of UV radiation to the UV sensitive substrate because the UV initiator may re-emit absorbed UV radiation at a lower energy, such as heat. The UV initiator may be selected such that re-emitted energy is below a predetermined energy, such as the energy required to degrade the UV-sensitive substrate.

The self-healing portion includes a self-healing precursor and a self-healing initiator. The self-healing portion is dispersed in the self-healing polymer such that a fracture in the self-healing polymer will contact the self-healing precursor and the self-healing initiator. The self-healing precursor and the self-healing initiator are selected to inhibit propagation of a fracture through the polymer matrix after contact between the self-healing precursor and the self-healing initiator. The self-healing precursor and/or the self-healing initiator are maintained within deposits throughout the polymer matrix. In some aspects, the deposits are within well-defined containment structures such as microspheres or tubular structures having a relatively uniform size distribution. In some aspects, the deposits of the self-healing precursor and/or the self-healing initiator are formed because the self-healing precursor and/or self-healing initiator are contained within well-defined containment structures formed by a separate encapsulant. In some aspects, the deposits of the self-healing precursor and/or the self-healing initiator are formed because the self-healing precursor and/or the self-healing initiator are immiscible within the binary mixture.

As a fracture propagates through the polymer matrix, the fracture will contact the self-healing precursor. The self-healing precursor is configured to be flowable such that, in response to contact with the fracture in the self-healing polymer, the self-healing precursor fills at least a portion of the fracture. In some aspects, the self-healing precursor is configured to polymerize in response to contact with the self-healing initiator to thereby inhibit propagation of the fracture. In some aspects, the self-healing initiator is a UV initiator and the self-healing precursor polymerizes in response to contact with the self-healing initiator during or after exposure to UV radiation. In some aspects, the self-healing initiator is the UV initiator used to initiate polymerization of the polymer matrix.

The distribution and amount of self-healing precursor within the polymer matrix are selected to inhibit fractures from propagating further than a certain average distance. For example, an increased load of the self-healing precursor reduces the statistical distance a fracture may propagate through the self-healing polymer before the fracture would contact a deposit of the self-healing precursor.

In some aspects, the self-healing portion is substantially uniformly distributed throughout the polymer matrix. In some aspects, the self-healing portion is loaded more heavily toward one or more boundaries of the polymer matrix. Specifically, the self-healing portion may be loaded more heavily toward an exterior surface of the self-healing polymer coating that is distal a substrate, such as a UV-sensitive substrate. Beneficially, such a non-uniform distribution may inhibit propagation of fractures from the boundaries of the self-healing polymer while reducing the overall amount of self-healing portion required to inhibit fracture propagation.

In some aspects, the self-healing precursor is selected such that the self-healing precursor and polymers formed therefrom may attach to active sites within the polymer matrix. Beneficially, such an attachment may increase the strength of the self-healed portion and provide greater resistance against further propagation as compared to healed portions that are not attached to active sites of the polymer matrix.

In some aspects, the self-healing precursor is selected to polymerize through a cationic ring-opening polymerization process. In some aspects, the self-healing precursor is a cyclic molecule capable of polymerization. In some aspects, the self-healing precursor is a cyclic ether. In some aspects, the self-healing precursor is cyclic ether having the chemical formula $CH_2OC_2H_4O$.

In some aspects, the self-healing initiator is a Lewis acid compound to initiate the ring-opening polymerization. In some aspects, the self-healing initiator is flowable such that, upon contact with the fracture, the self-healing initiator fills at least a portion of the fracture. Beneficially, a flowable self-healing initiator may increase the rate of polymerization through increased mixing with the self-healing precursor. In some aspects, the self-healing initiator is an alkali metal imide compound. In some aspects, the self-healing initiator is an alkali metal bis(fluorosulfonyl)imide.

Referring now to the FIGURE, a method 100 of providing a self-healing polymer is shown. The method 100 includes preparing 102 a binary mixture including the UV-absorbing-matrix precursor portion and the self-healing portion, forming 104 the self-healing polymer by initiating polymerization of the matrix and the UV initiator, and protecting 106 an exterior surface of a UV-sensitive substrate with the self-healing polymer coating.

The self-healing portion includes a self-healing precursor that is flowable and a self-healing initiator. The UV-absorbing-matrix precursor portion includes a matrix precursor and a UV initiator. Initiating polymerization of the matrix and the UV initiator thereby forms a polymer matrix. The self-healing portion is dispersed substantially throughout the polymer matrix. In some aspects, the polymer matrix includes a plurality of active sites for polymerization.

In some aspects, the binary mixture is prepared by mixing the UV-absorbing-matrix precursor portion and the self-healing portion together in solution. In some aspects, the self-healing portion is added to the UV-absorbing-matrix precursor portion immediately prior to initiating curing of the UV-absorbing-matrix precursor portion to inhibit polymerization of the self-healing precursor. In some aspects, the UV-absorbing-matrix precursor portion and one of the self-healing precursor and the self-healing initiator are mixed together while the other of the self-healing precursor and the self-healing initiator is added to the mixture immediately prior to initiating curing of the UV-absorbing-matrix precursor portion to inhibit polymerization of the self-healing precursor. In some aspects, the binary mixture is applied to the UV-sensitive substrate prior to forming the self-healing polymer coating.

In some aspects, the binary mixture is applied to a removable backer prior to initiating polymerization of the matrix. After polymerization of the UV-absorbing-matrix precursor has proceeded to a predetermined extent that the self-healing polymer is freestanding and manipulatable without damage, the removable backer may be separated from the self-healing polymer. The self-healing polymer may then be placed on the UV-sensitive substrate. Placement of the self-healing polymer may be achieved through abutting or adhering the self-healing polymer with the UV-sensitive substrate.

For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

What is claimed is:

1. A self-healing polymer coating comprising:
    a polymer matrix formed by initiating polymerization of a UV-absorbing-matrix precursor and a UV initiator, the polymer matrix including a plurality of active sites therein; and
    a self-healing portion disposed within and distributed throughout the polymer matrix, the self-healing portion including a self-healing precursor that is flowable and a self-healing initiator, the self-healing initiator configured to polymerize the self-healing precursor using a cationic ring opening process,
    wherein the self-healing initiator is a Lewis acid compound or an alkali metal imide compound.

2. The self-healing polymer coating of claim 1, wherein the self-healing precursor is a cyclic ether and the self-healing initiator is a Lewis acid compound.

3. The self-healing polymer coating of claim 1, wherein the self-healing precursor is a cyclic ether having a chemical formula of $CH_2OC_2H_4O$ and the self-healing initiator is an alkali metal bis(fluorosulfonyl)imide.

4. The self-healing polymer coating of claim 1, wherein the self-healing initiator is a UV initiator.

5. The self-healing polymer coating of claim 1, wherein the self-healing precursor, in response to contact with a fracture in the self-healing polymer coating, fills at least a portion of the fracture, and the self-healing precursor, in response to contact with the self-healing initiator, polymerizes to thereby inhibit propagation of the fracture.

6. The self-healing polymer coating of claim 1, wherein the UV-absorbing-matrix precursor is a branched acrylate having a functional moiety selected from the group consisting of a carboxylic acid and an ester and the UV initiator is 1,1-diphenylmethanone.

7. The self-healing polymer coating of claim 4, wherein the self-healing initiator is 1,1-diphenylmethanone.

8. A method comprising:
preparing a binary mixture including a matrix precursor portion and a self-healing portion, the self-healing portion including a self-healing precursor that is flowable and a self-healing initiator, the matrix precursor portion including a UV-absorbing-matrix precursor and a UV initiator, wherein the self-healing initiator is a Lewis acid compound or an alkali metal imide compound;
the self-healing initiator configured to polymerize the self-healing precursor using a cationic ring opening process;
forming a self-healing polymer coating by initiating polymerization of the UV-absorbing-matrix precursor and the UV initiator to thereby form a polymer matrix, the self-healing portion disposed within and distributed substantially throughout the polymer matrix, the polymer matrix including a plurality of active sites therein; and
protecting an exterior surface of a UV-sensitive substrate with the self-healing polymer coating.

9. The method of claim 8, wherein the self-healing precursor is a cyclic ether and the self-healing initiator is a Lewis acid compound.

10. The method of claim 9, wherein the UV-absorbing-matrix precursor is a branched acrylate.

11. The method of claim 8, wherein the binary mixture is applied to the UV-sensitive substrate prior to forming the self-healing polymer coating.

12. The method of claim 8, wherein the self-healing precursor is a cyclic ether having a chemical formula of $CH_2OC_2H_4O$ and the self-healing initiator is an alkali metal bis(fluorosulfonyl)imide.

13. The method of claim 12, wherein the UV-absorbing-matrix precursor is a branched acrylate having a functional moiety selected from the group consisting of a carboxylic acid and an ester and the UV initiator is 1,1-diphenylmethanone.

14. The method of claim 8, wherein forming the self-healing polymer coating includes applying the binary mixture to a removable backer, and wherein protecting the exterior surface of the UV-sensitive substrate includes removing the self-healing polymer coating from the removable backer and applying the self-healing polymer coating to the exterior surface of the UV-sensitive substrate.

15. The method of claim 8, wherein the UV-sensitive substrate includes para-aramid.

16. The method of claim 15, wherein the UV-sensitive substrate is a pressurized vessel.

17. The method of claim 8, further comprising:
filling, in response to a fracture formed in the polymer matrix contacting the self-healing precursor, at least a portion of the fracture with the self-healing precursor; and
polymerizing, in response to the self-healing precursor contacting the self-healing initiator, the self-healing precursor to thereby inhibit propagation of the fracture through the self-healing polymer coating.

18. The method of claim 8, wherein the self-healing portion is present in the binary mixture in an amount of 50% by weight based on the weight of the binary mixture and the matrix precursor portion is present in the binary mixture in an amount of 50% by weight based on the weight of the binary mixture.

\* \* \* \* \*